May 24, 1938.                    W. J. BARTLETT                    2,118,137
                                TESTING APPARATUS
                              Filed July 18, 1934
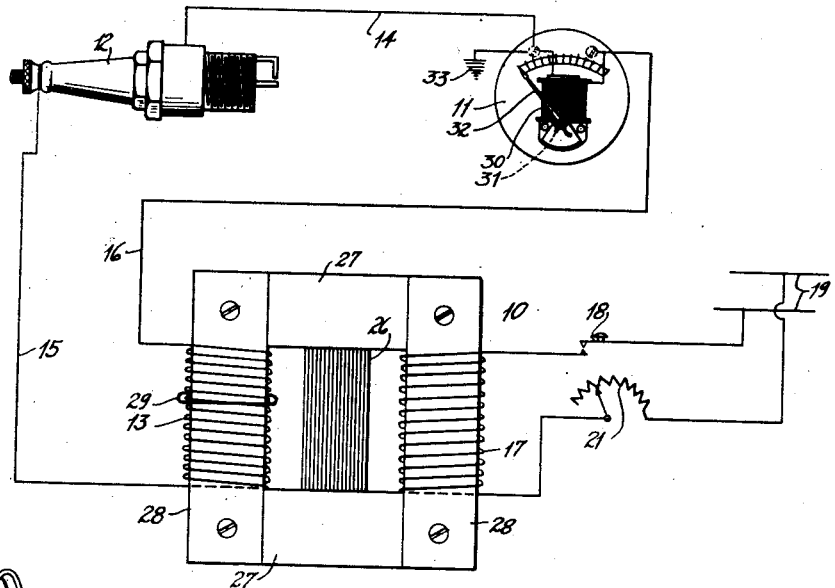
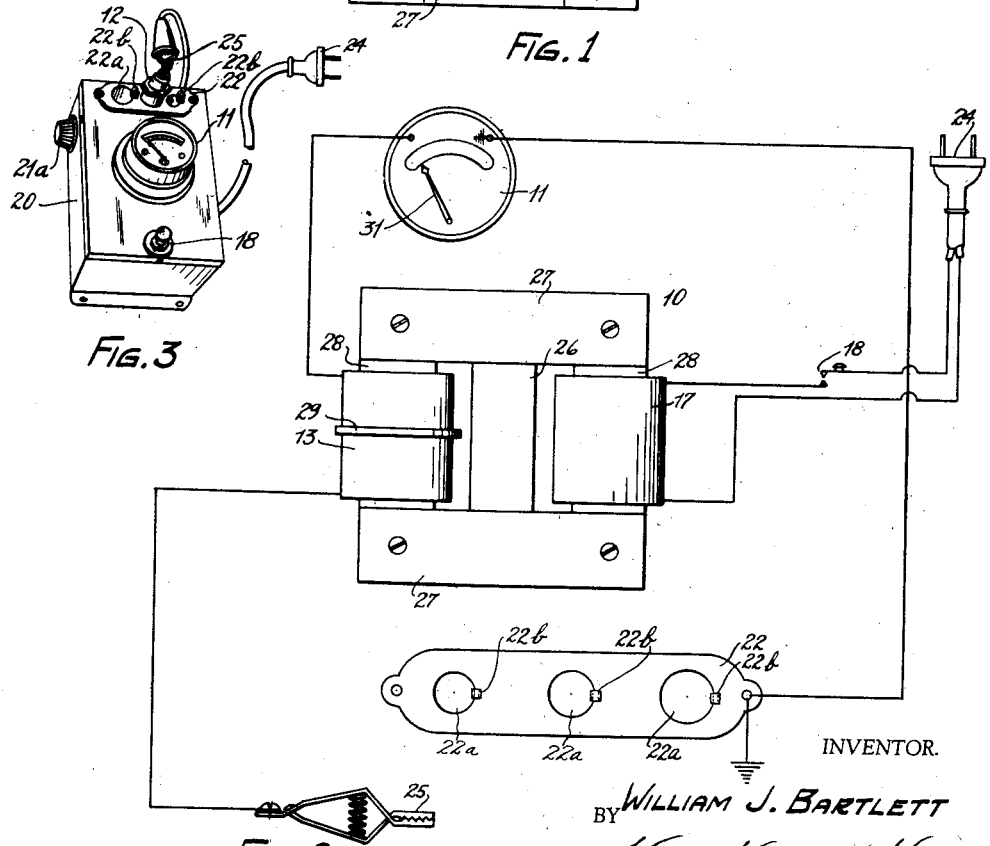
INVENTOR.
BY WILLIAM J. BARTLETT Patented May 24, 1938

2,118,137

UNITED STATES PATENT OFFICE 2,118,137

TESTING APPARATUS

William J. Bartlett, South Euclid, Ohio, assignor to The Electric Heat Control Company, Cleveland, Ohio, a corporation of Ohio Application July 18, 1934, Serial No. 735,851

1 Claim. (Cl. 175—183)

This invention relates to testing apparatus and has particular reference to a tester for spark plugs of motor car ignition systems.

The common practice at the present time is to test spark plugs by directing a stream of dry air across the terminals to determine at what air pressure the spark is extinguished.

The object of the present invention is to provide a tester which will test plugs more conveniently, rapidly, and accurately than the conventional compressed air type of equipment.

A further object is to provide a tester wherein the condition of the spark plug is determined by reading on an electric indicating meter the value of the current passing across the terminals of the plug.

The current is preferably derived from a regular A. C. lighting and power circuit and is supplied to the plug and electric meter through a special transformer which admits of the passage of current of very small amperage and of sufficient voltage to jump the terminals of the spark plug and give an accurate, steady reading which is accurately indicative of the condition of the plug.

The invention may be further briefly summarized as consisting in certain combinations and arrangements of parts which will be described in the specification and set forth in the appended claim.

In the accompanying sheet of drawing,

Fig. 1 is a diagrammatic view illustrating the electrical connections utilized in testing a spark plug which is here shown in the circuit between the secondary of the transformer and the electric indicating instrument;

Fig. 2 is a view somewhat less diagrammatic illustrating the parts which are preferably employed in the tester; and Fig. 3 is a perspective view of the tester with the parts housed in a casing, as the tester is generally sold and used.

In accordance with the present invention, an extremely simple tester of few parts gives very satisfactory results, these parts including a special transformer 10 the details of which will be referred to presently, and an electric meter 11 the terminals of which are adapted to be electrically connected to the terminals of a spark plug 12 (Fig. 1) and to the secondary 13 of the transformer 10, the effective electrical connections of which are illustrated in Fig. 1 by a conductor 14 connecting one terminal of the instrument to the normally grounded part of the spark plug, a conductor 15 connecting the normally insulated terminal of the spark plug to one terminal of the transformer secondary, and a conductor 16 connecting the other terminal of the transformer secondary to the other terminal of the instrument 11. The primary 17 of the transformer 10 is adapted to be connected through a suitable switch 18 to the conductors of an A. C. lighting and power circuit indicated at 19. The effective electrical connections are all indicated by conductors in Fig. 1, but in practice the connections may be and, in fact, are established partly by ground connections, as indicated in Fig. 2.

In practice, the tester includes a box or casing 20 (Fig. 3) which houses the transformer 10, and, if desired, an adjustable rheostat, which is indicated at 21 in Fig. 1. This rheostat, if used, is connected in the primary circuit of the transformer to compensate for varying line voltages, with the knob or control element 21ª of the rheostat projecting through the side of the casing as shown in Fig. 3. The instrument 11 is preferably mounted on top of the casing, and mounted in the upper wall of the casing are the switch 18 and a metal adapter 22 having provision for supporting the spark plugs being tested. In practice, this adapter has a plurality of sockets 22ª of different sizes, as indicated in the drawing, to accommodate plugs of different sizes or designs. To test a plug, the body or normally grounded part thereof is slipped into one of the sockets and is thus grounded on the adapter which in turn is grounded as indicated in Fig. 2. In order that the plug may fit tightly or closely in the socket when inserted therein, the adapter is provided with short leaf springs which may be formed of phosphor-bronze or other suitable material, each leaf spring extending down into one of the sockets. The spring makes the plug fit tightly in the socket and therefore causes the plug to make good electrical connection with the wall of the socket. Of course other means may be employed, if desired, to cause the plug to tightly engage the adapter.

The connection between the primary 17 and the lighting circuit is preferably made by means of a connection plug 24 adapted to be inserted in the usual wall socket, and the connection with the insulated terminal of the spark plug being tested is preferably made by an ordinary connection clip 25 which is connected to one terminal of the transformer secondary 13. In Fig. 3 a spark plug 12 is inserted in the adapter ready for testing and the connection clip is snapped onto the insulated terminal of the plug.

As previously stated, a special transformer 10 is employed the special features of which will now be referred to. To restrict the flow of current from the secondary 13 of the transformer across the terminals of the spark plug to be tested and through the coil of the instrument 11 (to be described more fully hereinafter) to the value of milliamperes, a maximum of about 10 milliamperes being normally sufficient, I employ a magnetic shunt 26 which extends between the two spaced legs 27 of the transformer core which in turn are connected to the two legs 28 about which are wound respectively the primary coil 17 and the secondary coil 13. This magnetic shunt 26 is formed of laminae as are also the legs 27 and 28 of the transformer. This shunt produces a high-leakage effect by diverting a sufficient amount of the flux threading through the transformer from the leg which is surrounded by the secondary 13 to reduce the secondary current to the desired value. Additionally, I place around the secondary coil 13 a copper ring or short-circuited band 29 the purpose of which is to steady the secondary current flowing across the terminals of the plug and through the coil of the instrument so that accurate, steady readings will be given by the instrument 11.

The instrument 11 is of the direct reading type, and for this purpose I prefer to use a sensitive instrument, such as a high resistance milliammeter having a stationary coil 30 and a pivoted vane armature 31 to which is connected an indicating needle 32. One terminal of the coil 30 is grounded on the base or frame of the instrument 11 so that there will be no difference of potential between these parts, thereby avoiding all danger of arcing between them, the grounding being indicated at 33 in Fig. 1.

To test the spark plugs of an engine, they are removed from the engine and are successively placed in a socket 22ª of the adapter 22. The clip 25 is then snapped onto the insulated terminal of the spark plug in the adapter, and, assuming that the connection plug 24 is connected in the socket of the lighting circuit, when the switch 18 is closed a low value current of proper voltage flows from the secondary across the terminals of the plug and through the coil of the instrument, and the position which the needle of the instrument assumes indicates at once whether the plug is good or bad. Assuming that the spark plugs were previously cleaned, if the reading is below a given number of milliamperes the plug is defective and should be discarded. On the other hand, if the plug is efficient, that fact will be indicated by a higher reading of the instrument. Other conditions of the plug can be ascertained by the position which the needle takes or by whether or not the needle takes and remains in a definite position. For example, if the needle takes a high position, i. e., if the needle gives a high reading, that fact indicates that the plug is shorted. Furthermore, a wavering of the needle or an unsteady positioning indicates loose, ragged or burnt electrodes. The scale of the instrument need not be graduated in milliamperes since, in practice, deflection of the needle from zero position will give the necessary indication of the good or bad character of the plug being tested without the necessity of figures denoting the actual flow of current in milliamperes. In some instances I have divided the scale simply into sections marked "Bad", "Weak", "Good", and "Short", indicating respectively, (1) a bad or defective spark plug which should be discarded, (2) a weak plug which may be used but which will not give the best performance, (3) a good plug, and (4) a plug the terminals of which are shorted.

In this manner, with a compact and simple form of tester, readings to determine the quality of spark plugs can be obtained easily, quickly, and accurately, and results far more satisfactory are thereby obtained than are possible with the conventional method of testing requiring the use of compressed air.

While I have shown and described the preferred embodiment of the invention, certain changes may be made in details, and I aim in my claim to cover all modifications which do not involve a departure from the spirit and scope of the invention in its broadest aspects.

Having thus described my invention, I claim:

A spark plug testing device comprising a transformer having primary and secondary windings and a core with a magnetic shunt adapted to produce a high-leakage effect, said transformer also including a short-circuited band surrounding the secondary winding and a portion of the core, means for connecting the primary winding with an available power and lighting circuit including a manually operable switch for controlling the energization of the primary winding from said circuit, a holder adapted to receive a spark plug to be tested and to hold the same during the test with its points surrounded by air of normal atmospheric pressure, said holder providing an electrical connection to one of the terminals of said plug, circuit connections for connecting the secondary winding with said holder and with the other terminal of said spark plug, a meter having a coil connected in series in the secondary winding circuit and a pointer movable to afford a direct indication of the quality of the spark plug being tested, and ground connections for grounding the coil of said meter and said holder.

WILLIAM J. BARTLETT.